(No Model.)
T. POLING.
DEVICE FOR WELDING PLOWSHARES.
No. 315,162. Patented Apr. 7, 1885.
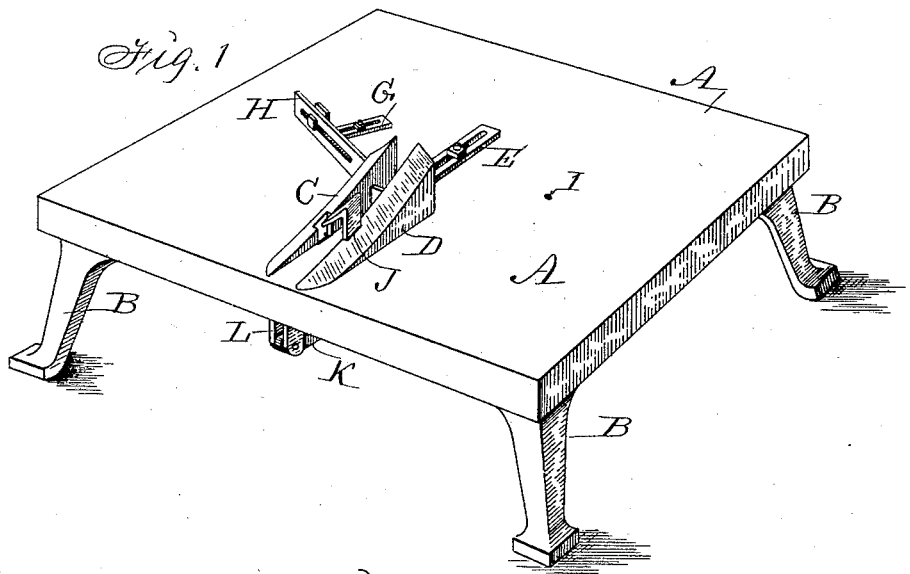
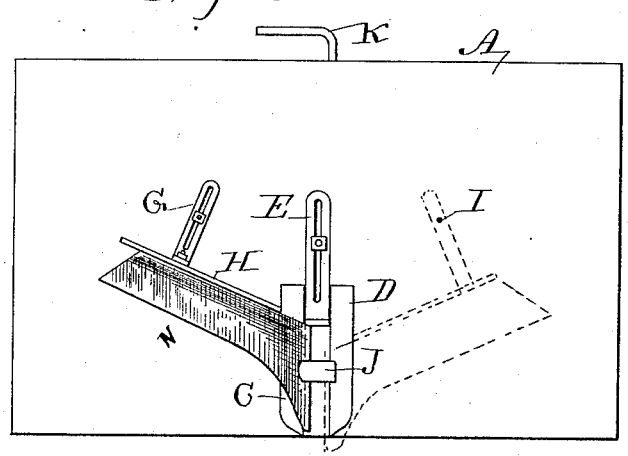
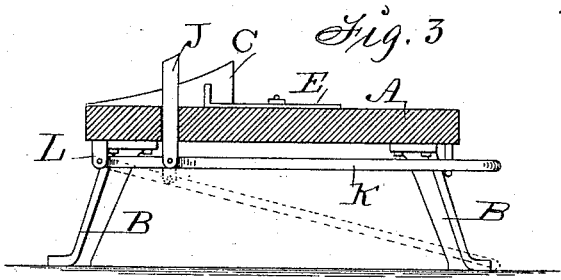
Witnesses:
W. F. Gould
R. H. Orwig
Inventor:
Totten Poling,
By Thomas G. Orwig, Atty.

UNITED STATES PATENT OFFICE.

TOTTEN POLING, OF MENLO, IOWA.

DEVICE FOR WELDING PLOWSHARES.

SPECIFICATION forming part of Letters Patent No. 315,162, dated April 7, 1885.

Application filed October 2, 1884. (No model.)

*To all whom it may concern:*

Be it known that I, TOTTEN POLING, a citizen of the United States, residing at Menlo, in the county of Guthrie and State of Iowa, have invented a new and useful Machine for Welding Plowshares, of which the following is a specification.

The object of my invention is to facilitate the welding of plowshares by providing a machine in which the parts to be welded are firmly held while being hammered together.

My invention consists in the construction and combination of a bed-plate, two swages, movable guides, and a clamping device, to operate as hereinafter set forth. I attain this object by the mechanism illustrated in the accompanying drawings, in which—

Figure 1 is a perspective view of the complete machine; Fig. 2, a top view of same, and Fig. 3 a transverse section taken between the two swages.

Similar letters refer to similar parts throughout the several views.

A is a cast-iron bed-plate supported on legs B, which are bolted to it.

C and D are swages cast integral with the plate A and conforming in shape with the plowshare to be welded.

E is a guide formed of a piece of flat iron turned up at one end. The part resting on the bed-plate is slotted, as shown. It is secured by a bolt passing through the slot and a hole in the bed-plate, having a nut on its upper end. By means of this slot and bolt and nut the guide E can be clamped fast at any desired point.

G is a guide-carrier formed in the same manner as the guide E, with the exception that its upturned end has a bolt passing through it, which engages a slot in the guide H. By means of these slots and bolts the guide H can be placed at any desired angle relative to the swage-block C.

In welding a left-handed plowshare the guide-carrier G and guide H are moved to the other side of the bed-plate, the bolt which secures the carrier G being then passed through the hole I.

J is a vertical iron hook or clamp, which passes through a slot cut in the bed-plate and a groove in the side of the swage D. The hooked portion is long enough to overlap the inner edge of the opposite swage, C.

In welding left-handed plowshares the clamp J is passed through another slot in the bed-plate, so that it will rest in the groove cut in the side of the swage C. The lower end of the clamp J is flexibly connected to the lever K, whose fulcrum L is fixed to the under side of the bed-plate. The free end of the lever K projects beyond the bed-plate and is bent, as shown. When the clamp J is raised, the lever K rests on a hook, M, attached to the under side of the bed-plate.

In the practical operation of my invention the guides H and E are adjusted to the shape of the plowshare as shown in Fig. 2, N representing a plowshare in position to be welded. The clamp J is raised. The pieces to be welded, having been brought to a welding heat, are placed upon the bed-plate and against the guides H and E, as shown in Fig. 2, the vertical piece of the plowshare resting against the flat inner side of the swage C. The clamp J is then depressed, as indicated by broken lines in Fig. 3, by placing the foot upon the bent end of the lever K, and while the pieces are thus held the smith and his helper form the weld.

I claim as my invention and desire to secure by Letters Patent—

1. A machine for welding plowshares, consisting of the following elements: a bed-plate, A, supported on legs B, having two swages, C and D, cast upon its upper surface, an adjustable guide, E, an adjustable guide, H, combined with an adjustable and transferable guide-carrier, G, and a clamp, J, combined with a lever, K, all substantially as shown and described, to operate in the manner set forth.

2. In a machine for welding plowshares, the combination of swages C and D with a clamp, J, and lever K, as and for the purpose set forth.

TOTTEN POLING.

Witnesses:
 GEO. E. DICKEY,
 THOS. JOHNSON.